United States Patent [19]

Ewing et al.

[11] 4,023,834

[45] May 17, 1977

[54] PUSH-TYPE COUPLING AND CONDUIT PIPE ASSEMBLY

[75] Inventors: Lloyd Ewing, Milwaukee; Michael J. Bykowski, West Bend, both of Wis.

[73] Assignee: Ewing Engineering Company, Milwaukee, Wis.

[22] Filed: May 2, 1975

[21] Appl. No.: 574,117

[52] U.S. Cl. .............................. 285/235; 24/115 N; 138/130; 285/305; 285/DIG. 16; 403/291
[51] Int. Cl.² ........................................ F16L 21/00
[58] Field of Search .......... 285/235, 305, 239, 259, 285/236, DIG. 16, 423; 403/291; 24/115 N, 122.3, 31 C; 174/84 R; 138/130, 138, 124

[56] References Cited

UNITED STATES PATENTS

| 839,260 | 12/1906 | Benson | 403/291 X |
|---|---|---|---|
| 1,473,362 | 11/1923 | Tilton | 285/305 X |
| 2,189,987 | 2/1940 | Kellems | 285/305 X |
| 2,434,358 | 1/1948 | Frank | 285/305 X |
| 2,711,331 | 6/1955 | Temple | 285/236 X |
| 3,186,048 | 6/1965 | Tann | 24/31 C |
| 3,210,100 | 10/1965 | Lowles et al. | 285/259 X |
| 3,453,006 | 7/1969 | Levake | 285/235 X |
| 3,558,164 | 1/1971 | Havell | 285/236 |

FOREIGN PATENTS OR APPLICATIONS

| 627,278 | 8/1949 | United Kingdom | 285/235 |
|---|---|---|---|
| 159,762 | 3/1921 | United Kingdom | 403/291 |

*Primary Examiner*—Thomas F. Callaghan
*Attorney, Agent, or Firm*—Pollock, Vande Sande & Priddy

[57] ABSTRACT

Lengths of pipe are joined together in above- or below-ground telephone conduit systems by flexible sleeves having specified coefficient of friction, column expansibility and pull-out resistance and containing helically oriented high modulus reinforcement, bonded or encapsulated in elastomeric material. The resultant pipe assemblies represent a significant improvement over previously known cemented conduit-coupling arrangements. Pipe sections may be quickly and economically joined without field application of adhesive, to provide water-tight, pull-out-resistant joints which will accomodate significant bending moments and shearing forces.

42 Claims, 4 Drawing Figures

U.S. Patent
May 17, 1977
4,023,834
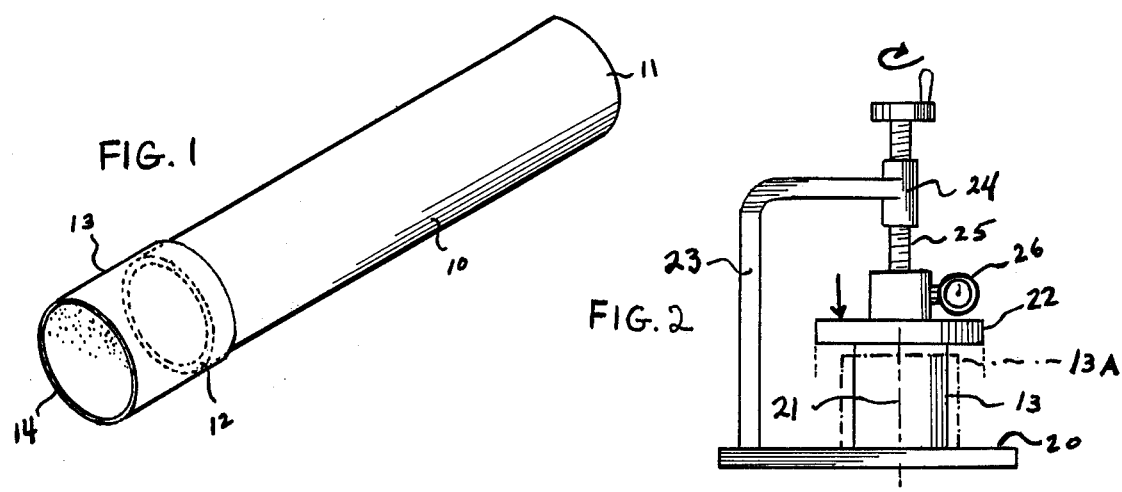
FIG. 1
FIG. 2
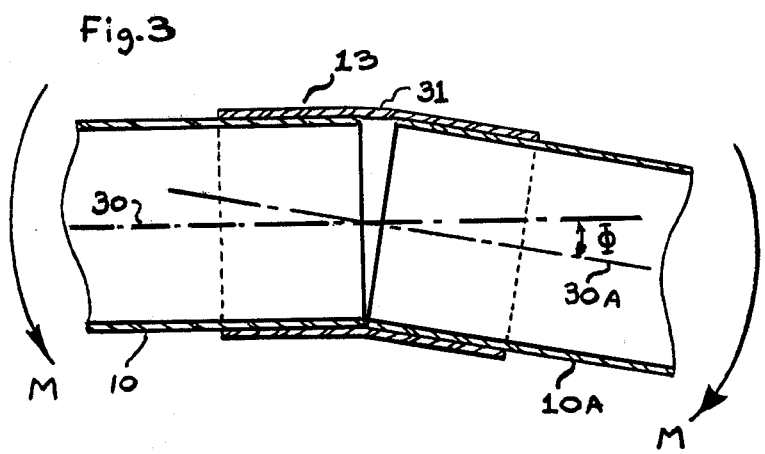
Fig. 3
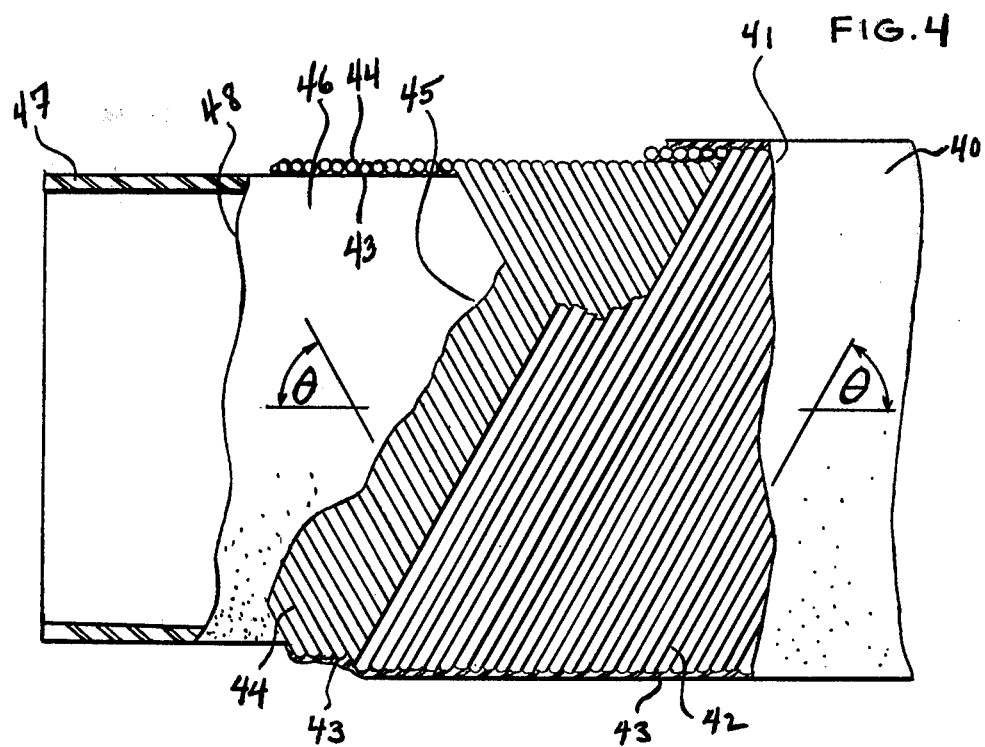
FIG. 4

PUSH-TYPE COUPLING AND CONDUIT PIPE ASSEMBLY

BACKGROUND OF THE INVENTION

In order to protect telephone cables from weather, ground water, vermin and other destructive elements, it is customary practice to run the cables through a protective pipe line referred to as "conduit". Normally, the pipe is of a rigid plastic material such as polyvinyl chloride or acrylonitrile butadiene styrene (ABS). The pipe must be of some limited length, normally about 20 feet or less, to facilitate shipping and handling. Accordingly, there must be some means of coupling the pipes.

It is essential that the coupling have good mechanical integrity to resist the various forces to which the conduit is subjected during and after installation. During installation, it becomes necessary to bend the conduit around corners, thus subjecting the couplings to significant bending moments. Once the conduit system is in place, the telephone cable is installed by pulling it through the conduit system from one end to the other. This subjects the conduit system to pull-out forces, forces along the pipe and coupling axes which tend to separate them. Moreover, after the cable is in place, the pipe is subjected to thermal expansion and contraction.

Due to the potentially costly and disabling results which can follow from the failure of burial ducts for telephone cables, and as a result of untoward experience with prior art couplings, telephone companies have developed stringent requirements for coupling performance. Notwithstanding a long and still continuing search, the development of acceptable couplings has proved to be a problem. There is considerable evidence that the solution to the problem is not obvious. The difficulty of finding an appropriate solution is evidenced by the fact that the cemented rigid plastic coupling, notwithstanding its rather serious disadvantages, is the dominant factor in the telephone conduit coupling field today.

One type of cemented coupling is a short cylinder having an inside diameter approximately equal to the outside diameter of the telephone conduit pipe. The ends of two adjoining sections of the pipe are inserted into such cylinder and "cemented" there by an adhesive. Alternatively, a bell-type coupling may be formed integral with one end of each section of pipe, so that the pipe has a "bell" end and a "free" end. The inside diameter of the bell is approximately equal to the outside diameter of the free end, so that the pipe sections may be joined in series with their free ends inserted in the bell ends and "cemented" with the adhesive. This type of coupling technique, which sounds simple enough, involves fundamental drawbacks pertaining to workmanship control, hazards to health, uncleanliness, flammability and delays.

The procedure for forming these joints begins with applying a volatile solvent, for example tetra hydro furan, to the inside of the coupling and to the exterior surfaces of the adjacent pipe sections before they are joined. Part of the solvent is absorbed by the coupling and pipe surfaces, and part of it dries, giving off vapors into the atmosphere. After a waiting period, which should be carefully timed in relation to the absorption and drying, the cement or adhesive is painted onto the pipe ends and coupling. This cement also contains a volatile solvent and gives off solvent vapors. Then, within a limited time which should be carefully controlled because of the rapid drying characteristics of the cement, the pipes and coupling must be assembled. However, the pipes may not be bent around a corner until the cement has cured for a period of time, e.g. 15 to 30 minutes, after assembly. While this delay can frustrate efficient installation, adding to conduit system costs, premature bending will ruin the pipe joint.

Tetra hydro furan and other solvents are considered hazardous to health. They are toxic and can cause unconsciousness. When cementing must be done in a ditch in which the conduit is to be buried, the vapors can accumulate at levels considered dangerous by government authorities. Some of the solvents used in these cements are highly flammable, creating a further hazard.

Use of the cement can be a dirty and disagreeable job. Spillage of cement and inadvertent contact with wet couplings and pipe ends creates a residue on clothing and worker's hands which is most difficult to remove, generally requiring clean up with the above-mentioned hazardous solvent. Also, because the pipe ends and coupling are in a sticky condition from the solvent and cement for some period of time prior to assembly, contamination of the pipe joints with dirt is a danger.

Considering all the disadvantages of the aforementioned method, it seems evident that if a better way of coupling the conduits were obvious, it would have been adopted long ago. Thus, a need remains for telephone conduit pipe couplings and coupling-pipe combinations which can be quickly and easily joined in the field to form pipe assemblies having stable joints, e.g. joints which can accomodate the usual pull-out forces, which are not adversely affected by bending immediately after installation, which do not invole field application of hazardous or messy adhesives and can be assembled without special techniques. The object of the present invention is to meet this longstanding need.

BRIEF SUMMARY OF THE INVENTION

The invention involves the discovery that a flexible sleeve having a certain combination of structural properties and elements makes an excellent pipe coupling, solving a number of long-standing problems. Couplings formed with the below-described properties, having a specified combination of elastomeric binder and helically wound fiber, increase in diameter upon axial compression thereof and decrease in diameter in response to axial tensile forces exerted thereon. Thus, when such a coupling is already connected to one pipe, with a portion of the coupling extending free, it is a simple task to connect a second pipe. The coupling will enlarge to facilitate its entry. The joint is complete as soon as it is pushed together.

The coupling diminishes in size when one tries to pull the pipe out of it. The coupling generates pull-out resistance substantially in excess of that which would be provided by the mere hoop-stress elasticity of the elastomer material in a plain elastomer sleeve. The harder one tries to pull out the pipe, the harder the coupling grips it. Thus, the coupling will hold satisfactorily under surprisingly adverse conditions, e.g. when it is wet and dirty. The coupling also internally generates resistance to shear and bending loads.

The couplings, when viewed in transverse crosssection, define closed, convexly rounded figures having a length to D ratio in the range of about ½ to about 2 and a wall thickness in the range of about 0.006 D to about 0.09 D. Throughout the present specification and claims, D refers to the nominal diameter (in inches) of the pipes which are or are intended to be, assembled with the coupling to make a joint.

One property of the couplings of the invention is that their inner surface has a coefficient of friction, relative to the material of the pipe, which is at least about 0.7. The coefficient of friction is the ratio of (a) the force required to cause one body in contact with another to begin to move, to (b) the perpendicular force between the surfaces.

Another property of the couplings of the invention is a column expansibility of at least about $1 \times 10^{-4}$ inches per pound. This is the circumferential increase of the coupling, per unit of circumference, per unit of force, per unit of circumference, when the coupling is compressed axially between parallel flat plates.

Moreover, the couplings are also characterized by a pull-out resistance of at least about 100 D pounds. This is the force in pounds which one of said couplings will withstand when subjected to axial pull-out forces, such as by clamping one of the pipes and pulling on the other pipe parallel to its longitudinal axis, with substantially no slippage of the joint.

When couplings are fabricated with a fiber-reinforced elastomer composite containing sufficient quantities of fiber and elastomer for providing the above-indicated column expansibility and shear resistance, highly advantageous couplings, coupling-pipe combinations and pipe assemblies can be produced.

The fibers referred to above have a modulus of at least about $6 \times 10^6$ psi. The fibers are oriented in an opposed, balanced helical pattern or patterns at a helix angle in the range of about 45° to about 75°. For purposes of this specification and claims, the helix angle is measured from a reference line parallel to the coupling axis with the coupling in an unstressed condition. In any given layer of said fibers the aforementioned helix angle is generally uniform throughout the length of the coupling. If there is a plurality of spaced layers of fibers in helical patterns, the helix angle in one layer may be the same as or different from the helix angle in another layer.

Th elastomer referred to above is an elastomeric binder which mechanically interconnects the opposed fibers at the above-indicated helix angle. More particularly, it assists in maintaining the shape of the coupling, fills the space between fibers, fixes the fiber alignment and transmits and distributes loads to and among the fibers. In general, the binder has a modulus which is substantially lower than that of the fiber. At 100% elongation, the binder should have a modulus of at least about 25 psi and at 300% elongation it should have modulus modylus of at least about 50 psi. The Shore A durometer hardness of the binder measured without the helical fiber, should be in the range of about 15 to about 90. The tensile strength should be at least about 300 psi.

In the above-described coupling-pipe combinations, a single cylindrical section of pipe is connected, e.g. gripped, by one of the aforementioned couplings in partially overlapping or telescoping relationship with at least about half or more of the length of the coupling extending free of the end of the pipe. The connection may be by way of mere frictional gripping, but preferably the coupling is adhesively bonded to the pipe section. The portion of the sleeve which extends free of the pipe provides a flexible push-type coupling into which the end of an adjoining pipe section may be inserted.

The pipe sections contemplated by the present invention, when viewed in transverse cross-section, define closed, convexly rounded figures. In general, these pipe sections will have sufficient circumferential rigidity, so that their circumference will not change more than about 1% on application of 100 pounds per square inch radial pressure thereto. In order to provide an interference fit with the coupling, the pipe sections will generally have a circumference greater than the inside diameter of the coupling (measured when the latter is in unstressed condition). The oversize of the pipe section may range up to about 2% of the inside circumference of the coupling. The aforementioned pipe shape, circumferential rigidity and interference fit co-act to transfer any forces from the conduit sections to the fibers of the couplings.

Pipe assemblies may be formed by joining the above-described pipes and couplings in series. With each pipe being grippingly engaged in telescoping, overlapping relationship by about 1/6 to about ½ of the length of each coupling. It is not essential that any of the couplings be adhesively bonded in any of the pipes in such assemblies, but is is preferred that about ¼ to about ⅓ of the length of each such coupling be adhesively bonded to one pipe section. The invention provides an especially advantageous technique for forming pipe assemblies from plastic (e.g. rigid polyvinyl chloride and acrylonitrile butadiene styrene) telephone conduit pipe.

Other detailed and preferred aspects of the invention are set forth in the drawings and in the description of preferred embodiments which follow.

BRIEF DESCRIPTION OF THE DRAWINGS

A better appreciation of the invention, including the below-described specific embodiments, may be obtained with the aid of the accompanying drawings, in which:

FIG. 1 is a prospective view of a coupling-pipe combination in accordance with the invention.

FIG. 2 is a schematic representation of the column expansibility property of the present invention and of a method of testing same.

FIG. 3 is a sectional side elevation of a coupling and two conduit ends, illustrating the bending resistance of a pipe assembly in accordance with the invention.

FIG. 4 is a side elevation of a coupling-pipe combination in accordance with the invention, partially in section, with successive portions broken away.

DESCRIPTION OF PREFERRED EMBODIMENTS

FIG. 1 discloses a preferred embodiment in which one of the above-described couplings 13 is connected with a pipe section 10 to form a pipe/coupling combination. The pipe and coupling define closed, convexly rounded figures when viewed in transverse cross-section, e.g. from the end. Examples include figures having four flat sides at right angles to one another, joined by rounded corners of substantially circumferential length; a 16-side figure (which is sufficiently nearly circular to act like a rounded coupling or pipe); an oval shape or a circle. In the preferred embodiment of FIG. 1, the coupling and pipe are continuously curved cylinders, essentially rounded figures.

The pipe may be of any material which provides the indicated circumferential rigidity. There are for instance the so-called "rigid" synthetic resin pipes, such as for instance polyvinyl chloride and acrylonitrile-butadiene-styrene (ABS). More preferably, the pipe 10 has sufficient circumferential rigidity so that its circumference change will be about one third to about one half percent or less on application of 100 psi radial pressure, which may be internal or external pressure.

The outer circumference of pipe 10 is "over-size", e.g. is greater than the inner circumference of the coupling 13. The amount of oversize is sufficient to provide enough friction between the outer circumference of the pipe and the inner circumference of the coupling to cause the fibers in the coupling to move when the pipe attempts to move relative to the coupling. While the oversize of the pipe, referred to above as "interference fit", may range up to about 2%, it is preferably about ½ percent or less and most preferably about one half to about 1 percent.

With the assistance of this interference fit, the coupling end 12 of pipe 10 is grippingly engaged by the overlapping portion of coupling 13, with or without adhesive. In general, this overlap should be in the range of about 1/6 to about ½ of the length of the coupling. Preferably, the overlap is about ¼ to about ⅓ of coupling length and the overlapping portions are adhesively bonded to one another by any suitable means, such as for instance by self-bonding of the coupling to the pipe or by a suitable glue. With adhesive bonding, more than about ⅓ overlap is wasteful of coupling material. The remainder of the length of the coupling, terminating in free end 14, extends free of the conduit coupling end 12. The free end 11 of the conduit 10 may be inserted into the free end of the coupling of another similar pipe/coupling combination to form a pipe joint. Free end 11 may be roughened or provided with grooves or embossment or may be adhesively bonded to assist in gripping the coupling.

Although the coupling wall thickness will generally be in the range of about 0.006 D to about 0.09 D inches, a preferred range of coupling thickness is about 0.015 D to about 0.035 D inches. Thus, in the case of a coupling intended for a four inch nominal diameter pipe, the preferred coupling wall thickness would range from about 0.06 to about 0.14 inches.

In general, the coupling of the invention has a L/D, length to diameter ratio, in the range of about ½ to about 2. A preferred value is from about 1 to about 2. Thus, in a coupling for a four inch nominal diameter telephone conduit, a typical value of L/D is about 1.5.

The couplings of the invention are further characterized by a sufficient coeffcient of friction of the inner surface of the coupling relative to the outer surface of the pipe to cause the fibers in the coupling to move when the pipe attempts to move relative to the coupling. The coefficient of friction of its inner surface is at least about 0.7 and more preferably at least about 0.8. There is no reason why coeffcents of friction throughout the range of about 0.7 to about 1 (or even higher) may not be used. Substantial coefficients of friction are favorable from the standpoint of resisting the pulling apart of joints as a result of longitudinal and bending forces.

When loaded as in the manner of a column, the couplings of the invention expand in a controlled fashion in relation to the applied force. To define this property, the expression "column expansibility" is used. FIG. 2 illustrates the column expansibility property of the coupling.

In the drawing, the coupling 13 stands with its central axis 21 disposed vertically, between a first flat plate, stationary table 20, and a second flat plate, movable platen 22. A vertically oriented, crank-equipped screw 25 is supported in the internally threaded portion 24 of an arm 23 extending upwardly from and above table 20. Screw 25 is connected, through any suitable force measuring device 26, with platen 22. As the crank is turned, the platen 22 exerts a measured or measurable axial compressional force on the coupling between the parallel plates. As force is applied, the coupling will shorten in length and increase in diameter as shown in phantom illustration 13A.

To conduct the test, one measures the circumference of the coupling with a tape measure both before and after compression and then calculates the circumferential increase per unit of circumference, per unit of force, per unit of circumference, in inches and pounds. The circumference measurements may be taken at one or more convenient levels of applied force below the force which would collapse the coupling. For a typical 4 inch telephone conduit pipe coupling, such measurements have for instance been taken at force levels in the range of about 50 to about 300 pounds. In general, although the couplings of the invention exhibit a column expansibility of at least about $1 \times 10^{-4}$ inches per pound, a preferable value is about $2 \times 10^{-4}$ to about $20 \times 10^{-4}$ inches per pound. An exemplary value for a commercial telephone conduit pipe coupling would for instance be about $7 \times 10^{-4}$ inches per pound.

The pull-out resistance of the couplings can be measured by assembling one of them into a joint with two pipes. One pipe is clamped and an axial force is applied to the other pipe (away from the first pipe) through a tensile force gauge which can read the applied force in pounds.

The assembly force of the couplings is determined by applying to a pipe section, through a force measuring guage, the force required to push it into a coupling. The assembly force is read from the guage, taking the maximum reading prior to completion of assembly.

It is a particularly advantageous feature of certain preferred embodiments of the couplings that their pull-out resistance is several times as large as their assembly force. Thus, ratios of pull-out resistance to assembly force of at least about 3 to 1, and preferably at least about 8 to 1 are contemplated. Thus, for instance, in a four inch nominal diameter telephone conduit pipe coupling having a minimum pull apart force of about 400 pounds, the assembly force, with an axial misalignment not exceeding 3°, can be and preferably is less than about 50 pounds.

When subjected to bending moments, the couplings of the invention resist in a controlled fashion in relation to the applied force. To define this property, the expression "bending resistance" is used. FIG. 3 illustrates the bending resistance property of the couplings.

In the drawing, a pipe joint is formed by pipes 10 and 10A and coupling 13. The figure shows how the joint deforms when subjected to bending loads (loads which tend to angularly misalign the pipe section axes). Pipe 10 may be of any desired length and is clamped close to the coupling. Pipe 10A should be relatively long, e.g. 20 feet. Provision is made for applying force through a tensile force gauge perpendicular to the pipe axis at that end of pipe 10A which is remote from the coupling. The resultant bending load or force M indicated by arrows M causes the respective pipe axes 30 and 30A to assume angle Φ relative to one another. Normally, the wall of the coupling 13 would be cylindrical, but bending load M stretches the coupling wall at 31 and correspondingly deflects the end of pipe 10A.

The maximum bending moment which the joint will withstand without substantial slippage of the end of the coupling relative to the pipe surface is the bending resistance. When assembled on conduit of proper diameter, the coupling should withstand a moment of about 2,500 inch pounds or more, and more preferably about 6,000 inch pounds or more. The ends of some commercial telephone ducts will break before the preferred couplings tear.

Certain preferred embodiments of the couplings of the present invention resist shear loads. To define this property, the expression "shear resistance" is employed. A shear load tends to offset the coupled ends of pipe sections perpendicular to their axes. In testing shear resistance, a shear load or force is applied to the joint in such a manner that the respective axes of the pipes remain substantially parallel. The shear load produces an offset in the coupling wall and a corresponding deflection $d$, which is the distance by which the axes of the pipes are displaced from one another by the load.

The conduits of the present invention manifest this shear resistance by providing a deflection of, e.g. limiting the deflection to, less than about 0.12 inches per inch (inches of deflection per inch of pipe diameter, nominal, in inches) when a coupling and its immediately adjoining pipe sections are transversely sheared in cradles at 100 D pounds, while maintaining their axes essentially parallel. Preferably, the shear resistance is such as to limit deflection to about 0.06 inches per inch. An exemplary value for a commercial telephone conduit pipe coupling would for instance be about 0.03 inches per inch.

Certain preferred embodiments of the invention are further defined by the property of ring flexibility. This is the force per unit of deflection per unit of length when a coupling is compressed diametrically between parallel flat plates. This value can be tested or determined using the apparatus shown in FIG. 2, the coupling resting on its curved surface between the parallel plates with its axis horizontal. For purposes of these embodiments of the invention, the ring flexibility should be less than about 50 pounds per inch per inch. A typical value for a 4 inch telephone conduit pipe coupling is about 13 psi.

It should be understood that the pull-out resistance, assembly force, bending resistance and shear resistance tests described above are conducted with sections of pipe having the cross-section, circumferential rigidity and interference fit described herein. The tests are conducted with the coupling, pipes and surrounding atmosphere at room temperature (e.g. 70°–75° F). One third of the length of the coupling will be securely bonded with any appropriate adhesive to one of the pipes. If it is necessary to determine whether any slippage has taken place, this may be determined by drawing a pencil line around that pipe section which is not adhesively bonded to the coupling, immediately adjacent to the end of the coupling. The line is drawn prior to the application of the load employed in the test and is visually observed while the joint is under load to see whether slippage has occurred. Slippage is considered insubstantial if it ceases within 30 minutes and before the coupling moves from the pencil line by the thickness of the coupling wall. Usually, there will be no visually observable slippage.

In FIG. 4, successive portions of a sample coupling are broken away to reveal its internal construction. Starting at the right hand end of the figure we see an optional outer cover 40 of coupling 13. This outer cover is broken away at parting line 41 to reveal a layer of filaments 42 embedded in a matrix of elastomeric binder 43. Filaments 42, in turn, are broken away to reveal a layer of filaments 44 wound in the opposite direction and also embedded in the binder 43. While only two layers of filaments have been shown in this view, merely for the sake of simplicity, it will be understood that many more layers can be and normally are provided in practice. Filaments 44 are broken away along parting line 45 to expose the liner layer which is an optional but preferred element of the invention. The exterior surface 46 of the liner layer is shown in full round between parting lines 45 and 48, the filaments 44 being bonded directly to the liner layer by binder 43. To the left of parting line 48, the remainder of liner layer 47 is shown in a sectional mode.

The liner layer 47 can perform one or more useful functions. It may for instance be useful in improving the impermeability of the couplings. It may also be useful for protecting the fibers from fluids passing through the pipes, especially if the fibers are deficient in chemical resistance. Some liners can improve the frictional engagement between the pipe and the coupling. A liner with a high coefficient of friction relative to the pipe affords maximum transmission of force through the smallest possible contiguous area of pipe and coupling, enabling one to use small (and therefore less costly) couplings. If the liner is a material which has a yielding surface, it will redistribute its volume over surface irregularities on the pipe surface and improve the seal.

The liner layer should be bonded directly and/or indirectly to the fiber and binder sufficiently securely to transmit loads from the pipe through the liner to the fiber. With this object in mind, it is desirable to select material and dimensions for the liner which limit its deflection under shear loads. In general, the thinner the liner layer and the higher its bulk modulus (compression resistance), the better will be its resistance to shear deflection and its transmission of forces. Good shear strength enables the liner to carry pull out forces and axial components of shear stress between the fibers and the pipe barrel. It is beneficial if the liner material has the properties of hardness, modulus, strength and split tear resistance in the same ranges given herein for the elastomeric binder.

Consistent with the foregoing, it is possible to employ as a liner layer any material which provides the desired chemical resistance and/or friction properties and/or permeability and/or conformability. This liner may for instance be or include a layer of any thermoplastic or thermosetting rubbery material which may for instance be integral with or distinct from the innermost layer of reinforcing fiber. Particularly good results can be obtained by forming the liner layer from the same polymeric material as the binder layer described below. Other elastomers may be used.

This layer may for instance enter the coupling manufacturing process as a liquid resin, or as a preformed tube of solid rubber or resin, or as a band which is spirally wound on a forming member. The layer may also be a so-called "resin-rich layer", a layer of helical reinforcing fiber and elastomeric binder in which the resin loading is unusually high.

The liner may contain gritty material or even fibers with a higher coefficient of friction than those in the helically oriented fiber layer referred to above. For instance, the helically oriented fibers may be glass, while the reinforcing fibers in the inner liner may be of synthetic polymers of much lower modulus but of significantly greater coefficient of friction and chemical resistance.

As the foregoing discussion suggests, the fiber 42, 44 and elastomer binder 43 of FIG. 4 are essential structural elements of the coupling. They should be present in sufficient amount for providing the above-mentioned column expansibility and pull-out resistance and, when applicable, the indicated assembly force, bending resistance, shear resistance, ring flexibility and coefficient of friction. Thus, one may use binder in a weight percentage of about 40 to about 60 percent, based on the total weight of fiber and binder.

While the fiber material should have a modulus of at least about $6 \times 10^6$ pounds per square inch, there is in principle no upper limit on the modulus. The fibers may be of inorganic (including carbon) or organic material, such as for instance steel, stainless steel, copper, aluminum alloy 2014-T6, boron, graphite, E-glass, C-glass, S-glass and aramid fibers sold under du Pont's trade name Kelvar-49 and Kelvar-29 which exhibit moduli up to about $30 \times 10^6$ psi. However, E-glass and C-glass fibers, having moduli of $10.5 \times 10^6$ and $10 \times 10^6$ respectively, have proven most convenient and economical from a cost/effectiveness standpoint. Accordingly, a preferred range of modulus is from about $8 \times 10^6$ to about $13 \times 10^6$ psi. By way of comparison, the following are the moduli of certain other materials (psi $\times 10^6$): flax, 5.16; jute, 4.29; Enka rayon (HT), 2.4; cotton, 2.1; Dacron type 55, 2; viscose rayon, 1.34; Enka nylon (HT), 1.17; and nylon 66 (type 200), 0.51. Still lower values have been reported for Fortrel, caprolan nylon, polyethylene, and polypropylene. In general, materials which have the requisite modulus are strong enough.

Chemical properties are not significant, except to the extent that they may be involved in chemical resistance or resin compatibility. The relationship between fiber chemistry and weathering is in general sufficiently understood by those skilled in the art, and various fibers are commercially available with finishes which improve their resin compatibility. Also, fibers of the requisite resin compatibility may readily be selected by simple physical tests familar to those skilled in the reinforced plastics and rubber arts.

Fibers are commercially available in a wide variety of forms. The fiber components of the coupling are not limited to a particular form, except that if the fiber component is other than a filament, it should contain fibers which are substantially uniformly oriented in a predetermined direction which corresponds, or can be made to correspond, to the desired fiber orientation in the coupling. Thus, besides continuous filaments, it is possible to use yarn, roving, woven roving, scrim, tapes, cordage and various fabrics either of the continuous filament strand or spun strand type. The yarns may be single or plied, twisted or untwisted, finished or unfinished, but yarns and other fiber components with silane finish are preferred. The most preferred types of component are the continuous filament strand types of roving, yarn and cordage. For explanatory information on yarn or roving designations, characteristics and testing see ASTM D-578-61 (reapproved in 1972).

The fibers, in whatever form, are oriented in a helical pattern. That is, they are aligned with or follow helical lines on the peripheral surface of the coupling. The orientation is at a helix angle in the range of about 45° to about 75°, and preferably about 55° to about 75°, measured from a reference line parallel to the longitudinal axis of the coupling, with the coupling in unstressed condition.

The helical pattern or patterns are balanced, e.g. substantially equal quantities of fibers follow helical lines extending in opposite directions on the peripheral surface of the coupling. The indicated orientation can for instance be readily produced with filaments, strands, yarns, roving and cordage by known filament winding techniques, such as are described in "Filament Winding with Type 30 Roving", Owens Corning Fiberglas Corporation, May 1974.

The helix angle should be in both directions throughout the length of a given layer of helically oriented fiber, including at the end of the layer. Preferably such uniformity exists within each helically oriented layer. Thus, if the fiber orientation is produced by that type of filament winding process in which fiber is passed back and forth along and is wound onto a rotating mandrel, it may be necessary to cut off and discard the ends of the resultant composite where the direction of the fiber changes back and forth during the winding process. Each time the fiber changes direction, its angle relative to the axis of the mandrel (and therefore also relative to the axis of the resultant coupling) shifts from a predetermined helix angle in one direction through a helix angle of 90° to the same predetermined helix angle in the opposite direction. The relatively short zones at each end of the resultant composite in which this shifting takes place are referred to as zones of reversing fiber angle. If these zones were included in the coupling, they would interfere with their operation. Thus, to provide the desired properties, these zones of reversing fiber angle are excluded from the couplings.

The left and right hand oriented or wound fibers may be contiguous, e.g. fibers or filaments wound to the right are wound directly upon fibers or filaments wound to the left to form one layer which contains contiguous overlapping oppositely wound reinforcement. Or, left hand reinforcement may be separated from right hand reinforcement by a spacer layer. Or, the sleeve may include separate layers of reinforcement each containing both left hand and right hand oriented filaments or fibers.

A balanced, opposed pattern in the form of a single layer may be provided, for instance, using a preformed tubular woven roving in lieu of filament winding. On the other hand, single or multiple layers of fiber may be produced by that type of filament winding process in which a plurality of filament guide bars continuously rotate in opposite directions about a stationary mandrel continuously winding fiber into a composite of indeterminant length which continuously advances as it is formed to a cutting station to be cut into segments of a length appropriate for couplings. In such a process the fiber may be wound onto a continuously extruded tube constituting an inner layer of the couplings.

More than one layer of fiber can be built up in the composites without filament winding. When working with a helix of 45°, in which the opposing helixes will be at an angle of 90° to one another, one can build up layers of fiber material by layup of woven roving, scrim, tape and other fabrics. However, layup techniques and fabrics can also be used when working at other helix angles, when the fabric can be distorted before or during layup, to adjust the angle between the warp and weft to give the desired helix angle.

While it is preferred that helically oriented fiber components be present throughout the entire length of the coupling, it is contemplated that some or all of the individual fiber components themselves may not extend throughout the entire length. It is sufficient, whatever type of fiber component is used, that the individual lengths of fiber component fabricated into and present in the coupling extend along at least a substantial portion of the length of the coupling. By "substantial portion" is meant a sufficient portion of the length to produce the properties of column expansibility, pullout resistance and, where applicable, the other properties indicated above, as well as sufficient strength for the intended application. Substantial quantities of fibers may be present which are deficient in length or number of turns, or which are not oriented in the indicated manner, provided they do not prevent attainment of the desired properties.

In its preferred form, the coupling includes at least one or a plurality of lengths of fiber component, e.g. filament, strand, roving, yard or cordage, which extend helically throughout the length of the coupling in one direction, and at least one or a plurality of lengths of fiber component which extend helically throughout the length of the coupling in the opposite direction. In a particularly preferred embodiment, the helical pattern employed in the coupling includes a first multi-layer of fiber in which the fiber has been wound back and forth upon itself to form a plurality of sub-layers of fiber, and another distinct multi-layer in which the fiber has been wound back and forth upon itself to form a plurality of sub-layers. The distinctness of the layers may arise from the fact that they have been wound at different helix angles, or from the fact that they have been gelled at different times, or from the fact that they are separated by some material, or from a combination of these or other factors.

While high modulus and strength are generally desirable attributes in the fiber, the binder should have relatively low modulus of elasticity and high strength. The modulus of the binder affects the axial stiffness of the coupling, and hence the required to assemble it, e.g. to push a pipe into it. It is desirable that this stiffness be low enough to permit easy assembly. The modulus of a given binder may be reduced if desired by gelling it in a foamed condition. High strength is desirable for accomodating the large strain resulting from relative movement of individual fibers due to their close proximity and, in some cases, for obtaining the best possible utilization of the strength of reinforcing fiber which is loaded by shear forces.

Equipment for measuring the modulus of elasticity and strength of the binder material is generally available and well understood by those skilled in the art. The modulus and strength are determined with a cured solid sample of the binder without fiber and at room temperature using ASTM testing D-412.

Although the 100% modulus of the binder will in general be at least about 25 psi, it is preferably at least about 50 and more preferably about 50 to about 500 psi. A typical value for the 100% modulus of a binder used in a telephone conduit coupling is about 100 to about 300 psi. The 300% modulus of the binder will in general be at least about 50 psi, prreferably at least about 100 and more preferably about 150 to about 1200 psi. A typical value for the 300% modulus of a binder used in a telephone conduit coupling is about 200 to about 800 psi.

If if is intended that the binder, as formulated in the composite of the invention, will contain filler or additional fibers, e.g. non-oriented fibers, the samples for strength testing will be made up with such filler and additional fibers. Although the binder, as formulated, will generally have tensile strength of at least about 300 psi, it is considered preferable to use binders with a tensile strength of at least about 600 psi and more preferably about 1,000 to about 5,000 psi. A typical tensile strength for a binder used in the coupling for a telephone conduit will be about 3,000 psi.

Durometer hardness is measured with an instrument familiar to those in the elastomer art. While the durometer of the binder will generally be about 15 to about 90, it is preferably in the range of abut 15 to about 70 and most preferably about 30 to about 50. About 40 is a typical durometer value for the binders used in telephone conduit couplings prepared in accordance with the invention.

The binder may be or include any natural or synthetic polymeric elastomer which can perform the above-described functions and possesses substantially the modulus, strength and durometer hardness properties discussed above. Thus, for instance, there are natural rubber, neoprene, styrene butadiene rubber, polybutadiene rubber, polybutadiene, polyether urethanes with and without reinforcing fibers and fillers such as silica smoke, carbon black and the like. The preferred binder is formed by reacting a polyester-urethane prepolymer and a polyfunctional polyol curing system, preferably unfilled but with a compatible plasticizer. Among the commercially available polyester-urethane prepolymers, American Cyanamid Cyanaprene A-9 is preferred. While UpJohn Isonol 93 is a preferred triol curative, trimethylol propane, triisopropylanolamine and hexane triol are useful. The preferred plasticizer is Kronitex 100 triaryl phosphate, but di-(2-methoxyethyl) phthalate, Velsicol's Benzoflex 9-88 (dipropylene glycol dibenzoate) and other plasticizers are useful. Trimethyl piperazine may be used as an auxiliary catalyst to speed up curing. The preferred binder is characterized by good chemical resistance, weathering and tear resistance. For instance, the tear sensitivity (split tear in pounds per lineal inch) is generally greater than about 5 and more preferably greater than about 10 pounds per lineal inch. Thus, for instance, triol cured polyester-urethane prepolymer elastomer binders with a tear sensitivity of about 13 pli are typical in telephone conduit couplings. The considerations for determining the composition of samples made up for split tear testing are the same as those for the abovedescribed modulus and strength tests.

When constructing the couplings, one can manipulate various properties and capabilities thereof by varying the helix angle, the physical characteristics and quantity of reinforcement, the length of the joint, the coefficient of friction between the inner surface of the sleeve and the pipe material, the physical characteristics of the binder material, and the thickness and physical characteristics of the lining material, if any.

How much the coupling can expand for assembly and accomodating circumferential variations in the pipe depends on the extent to which the coupling structure will permit the helix angle to change and to a lesser extent on the stiffness of the binder. A helix angle change of, for instance, about 15° may occur in couplings in which the helix angle is about 45°. This angle change will decrease as a function of an increased helix angle. The range of about 45° to about 65° should provide a minimum diamaterial expansion of about 4°.

By varying the physical characteristics, quantity and the helix angle of the fiber in the coupling and the coefficient of friction between the liner and the pipe, one can control the pull-out and bending resistance of the joints formed with these couplings. Because of the interference fit between the coupling and the pipe, a slight tension $F_T$ will exist in the fiber reinforcement due to the deformation of the binder and the liner. This and the forces resulting from the deformation of the liner and the binder will have a component $F_N$ normal to the pipe surface which will provide a frictional resistant force $F_F$. This frictional force is equal in magnitude to the force required for assembly and is defined by the equation:

$$F_F = F_N \times B,$$

$B$ being the coefficient of friction for the pipe and liner material. A reversal of the assembly force tending to disassemble the pipe from the coupling will act through the potential frictional resistant force $F_F$ and stresses in the liner and binder to further increase the fiber tension $F_T$. The increase in $F_T$ will result in an increase in the normal component $F_N$, thus increasing the potential frictional resistant force $F_F$.

In accordance with a preferred embodiment, a sufficiently large helix angle and coupling length may be chosen, for any given coefficient of friction and pipe diameter, so that the frictional force tending to hold the coupling and pipe together will always be greater than the pull off or bending forces tending to separate the pipe and coupling and that movement of the pipe relative to the coupling will be substantially prevented until the point of fiber failure is reached. With frictional coefficients of about 0.7 to about one and angles of between about 75° and 45°, or with a preferred range of frictional coefficients of about 0.8 to about one, and angles in the range of 75° to 55°, economical coupling lengths can be produced.

Under applied forces that tend to eccentrically displace one joined pipe from the other, such as shear loading, the helically oriented fiber reinforcement resists such displacement by a resulting component of force parallel to the direction of the applied force and perpendicular to the axis of the pipe. The shear resistance of the conduit may be increased by increasing the helix angle, modulus, strength and quantity of the fiber.

In general, when one designs for maximum resistance against shear and/or bending and/or pulling apart, increased installation forces will result. However, various combinations of coupling structural properties and elements may be used to enhance the axial stability (column stiffness, e.g. ability to resist collapse during pipe insertion). Thus, using combinations of properties and elements described in succeeding paragraphs, one may provide a coupling with sufficient column stiffness to substantially prevent buckling of the coupling wall upon axial insertion of an unlubricated pipe end having a greater circumference, up to 2%, and preferably at least about 1/10% greater, than the inside circumference of the coupling. One may also design for substantial resistance to pulling apart and/or shear and/or bending while minimizing column stiffness, if one is willing to employ special techniques of assembly. An example is providing the interior of the pipe with sufficient superatmospheric pressure to avoid collapse of the couplings during pipe insertion.

In general, axial stability may be enhanced by increasing the wall thickness of the coupling or by other factors which increase the moment of inertia about the neutral axis of the section of an incremental arc of the sleeve. One simple means for increasing wall thickness is to provide the coupling with the outer cover 40 in FIG. 4. When the outer cover layer has a higher axial compressive modulus than the inner layer and reinforcement, column stability is favorably influenced. This stability is also favorably influenced if the outer skin has a higher axial compressive modulus than its circumferential tensile modulus. In this connection, the use of chopped oriented fiber in the outer sleeve may be useful. The outer cover layer may also be provided with axial ribs to achieve similar results If the fiber reinforcement includes an inner layer which is wound at a given helix angle within the above-specified range of about 45° to about 75° and a separate or distinct outer layer of fiber wound at a helix angle which is less than that of the inner layer by about 3° to about 10°, the axial stiffness of the joint can be improved.

However, the preferred manner of providing enhanced axial stiffness is to provide separate layers of reinforcement, oriented at the same or different helix angles and spaced by a layer of binder, or other elastomer, including for instance elastomeric form. Even though such foam material will have a substantially lower modulus than the fiber material, the resultant increase in moment of inertia can materially increase the wall stiffness, thus increasing the resistance of the coupling wall to buckling when large installation forces are involved. Typically, the foam is a layer of elastomeric (typically polyurethane) foam in the range of about —0.05 to about 0.2 inches thick and have a density in the range of about 60 pounds per cubic foot. This can for instance be applied to a first glass layer soon after it has been wound so that the foam becomes adhesively bound to the first layer. Then, a second glass layer, wetted by the binder, can be wound onto the foam layer and gelled.

Various adjuncts may be used in connection with the preferred joint. One may for instance provide means within the coupling, in contact with the ends of the pipe sections joined thereby, for exerting a force on these pipe sections which tends to push them apart. Such means may, for instance include materials and structures which are compressed by the pipe ends when they are pushed together. Examples include Bellville and wavey washers and elastomeric rings having a diameter substantially similar to that of the pipe. One may obtain some improvement in performance by providing the couplings with a reinforced central section, e.g. which surrounds the abutting ends of the pipes in the joint. A shear ring may be molded into the inner surface of the coupling. Tightenable band-type end clamps may be fastened around the couplings near each end. However, it will be apparent that these measures will add to the cost of the coupling and/or its installation. One advantage of the invention is that satisfactory performance for a wide variety of pipe joining applications may be obtained without the use of such adjuncts.

While the invention has been described as a coupling for pipe, it is contemplated that the coupling may also be used to join rods having the same cross-section, circumferential rigidity and interference fit referred to herein.

With the object of presenting one specific example of a coupling, a coupling-pipe combination and methods of making them, an example is presented below. The example is presented without any intention of limiting the scope of the invention, since it is evident that the invention may be embodied in many different forms. All parts are by weight unless the contrary is clearly indicated.

EXAMPLE

In general, the procedure of this example includes forming a coupling for four inch nominal diameter pipe. The coupling is formed on a convexly rounded supporting member, e.g. a mandrel 4.325 inches in diameter. Prior to the winding of the fiber, a liner layer is applied to the supporting member in the form of a helical pattern in the resultant couplings includes fibers which extend helically at a substantially uniform angle relative to the coupling axis from one end of the coupling to the other end thereof, and which terminate at said end.

The linear and binder are both based on the same polymeric material and have the same basic formulation. The base resin, having a Shore A durometer hardness of about 40 when cured, is American Cyanamid's Cyanaprene A-9 urethane resin. It is used in admixture with about 30 parts of Kronitex 100 triaryl phosphate plasticizer and 11.6 parts of UpJohn Isonal-93 triol curative, pre 100 parts urethane resin. The triol curative, as supplied, includes sufficient catalyst to provide a working time of about 2 hours before the mixture becomes gelled. Since a working time of about 10 minutes is sufficient for forming the liner an auxiliary catalyst, Dabco LV 33, is added to the liner formulation at a level of 0.5 parts per 100 parts of the triol curative. This type and amount of auxiliary catalyst does not appear to directly affect the hardness of the cured resin. The basic formulation, when cured with or without the auxiliary catalyst meets the test requirements set forth in Table I.

TABLE I

| Test | Test Requirement | ASTM METHOD |
| --- | --- | --- |
| Chemical Resistance | | D543 (48 h at 22C) |
| 1 N sulfuric Acid | no mass loss | |
| 1 N hydrochloric acid | no mass loss | |
| Tensile Strength | 1000 psi (7 M pa) min | D412 |
| | 250% min. elongation at break | |
| Hardness | 30 min - 50 max. | D2240 (Shore A durometer) |
| Accelerated oven aging | Decrease of 15% max of original tensile strength decrease of 15% max of original elongation | D573 (7 days at 70 ± 1C) |
| Compression set | decrease of 20% max of original deflection | D395 Method B (70C for 22) |
| Water Absorption | increase of 5% max of original | D471 as follows: Immerse 0.75 inch (19 mm) by 2 inch (51 mm) by 2 inch (51 mm) specimen in distilled water at 70C for 7 days |
| Ozone Resistance | Rating No. 1 | D1149 | liquid resin mixture of polyesterurethane prepolymer, triol curing compound and plasticizer. This layer is preferably at least gelled and can be cured prior to the winding of the fiber. The resin is considered gelled at the moment when it has increased sufficiently in viscosity to support the application of a succeeding layer, or has converted from liquid to solid form. The resin is cured when the polymerization (curing) reaction has progressed to peak exotherm or has progressed to attainment of the hardness, modulus and strength properties referred to herein. Continuous filaments, e.g. glass fiber in the form of roving, wetted with a liquid binder resin mixture of polyester-urethane prepolymer, triol curing compound and plasticizer, preferably of the same polymeric material as the liner, are drawn into the mandrel by rotation of the mandrel. The filaments are wound while being passed back and forth along the length of the forming member, thereby forming zones of reversing fiber angle at the ends of the composite. The liner, fiber and liquid binder resin are formed with an overall thickness of about ¼ or less. After the binder is at least gelled and preferably cured, the composite is removed from the mandrel, and one or more couplings are cut from the composite. The zones of reversing fiber angle are excluded from the couplings, so that the The glass roving used as fiber material is a silane-sized continuous filament strand roving with about a 675 yard per pound yield, Owens-Corning Product No. 475 CA-675.

It may be desirable to conduct the procedure under the usual conditions of humidity control normally observed with urethane resins. Otherwise, it may be difficult to control the durometer value of the liner and binder.

The procedure is conveniently carried out with three ovens, one for premelting to polyurethane resin at 157° F. Another oven can be used to preheat the polyurethane components to a temperature of 220° F. ± 5° prior to mixing. The third oven, also capable of maintaining 220° F ±5°, is large enough to receive the aforementioned mandrel and includes means for rotating the mandrel at 5–20 rpm.

The present example was conducted with a Model B Explorer Filament Winding Machine, manufactured by McClean-Anderson, Inc., Milwaukee, Wisconsin. The machine has a horizontal rotating chuck to hold the mandrel and a traversing funnel, which is driven back and forth horizontally about 6–10 inches above the mandrel by a sprocket and roller chain traverse drive. One can disconnect the traverse drive and move the funnel to one end out of the way when it is not being used. When the funnel is in position for use, the filament is threaded from a supply above or behind the machine into the wide opening at the top of the funnel, past a plastic stopper in the arrow mouth at the bottom of the funnel and onto the mandrel. Rotation of the mandrel draws the filament from the source of supply through a supply of resin held above the stopper in the funnel and then onto the mandrel. The horizontal chuck and the drive for the funnel each have separate counters and speed controls, whereby the pitch or angle at which the filament is wound on the mandrel may be varied.

For purposes of carrying out the present invention, a sliding platform was added to the frame of the winding machine. It supports a doctor blade in front of the mandrel, which blade converges from a position above the axis of the mandrel towards its cylindrical surface. The blade has a working position in which its straight-edge is close to the mandrel surface, at about the same elevation as and parallel to the mandrel axis, forming a gap .017 inches wide through which a level layer of liquid resin of accurately controlled thickness can be applied to the mandrel. Having the doctor blade mounted on the sliding platform enables one to back it away from the mandrel, so that it will not interfere with the winding operation.

Still another addition to the machine was a comblike device beneath the funnel, which travels back and forth with the funnel. It enables one to feed multiple strands of roving from the funnel onto the mandrel in a flat, parallel pattern in which adjacent strands are laterally separated from one another. The spacing may be varied but for purposes of the present example was about ⅛ inch, e.g. about equal to the width of the roving itself.

A further addition to the winding machine was a movable holder carrying a shaft-mounted disc which is free to rotate on an axis parallel to the mandrel axis. This metal disc, having a sharp cutting edge, may be pressed against the mandrel so that it will cut through whatever material is on the mandrel at any point along the length thereof.

The mandrel is coated with Teflon and is provided with a number of blow-holes in its circumferential surface. connected through passages in the body of the mandrel with a source of high pressure air. Release of air between the mandrel surface and a coupling thereon expands the coupling and facilitates its removal. To prevent fouling of the blow holes during application of liquid resin they may, for instance, be taped shut with small pieces of very thin heatresistant tape. The tape, along with the coupling, is dislodged by the high pressure air.

In carrying out the procedure, the urethane resin is heated in the 157° oven and melted. The mandrel is preheated to 220° F in the rotating oven. A liner batch of 100 grams of urethane resin and 30 grams of plasticizer for the liner are weighed out, heated to 220° F, mixed (while seeking to avoid excessive air entrainment) and degassed. There will be some initial foaming of the urethane resin and plasticizer, and the degassing is continued for sufficient time with sufficient vacuum merely to break to bulk of the foam initially formed. This may be accomplished in a vacuum chamber which can produce an absolute pressure of about 0.5 inches mercury in about one minute or less. The resultant mixture is placed in the 220° F oven. Following a similar procedure, a binder batch of 300 grams of urethane resin and 90 grams of plasticizer are weighed out, heated, mixed and degassed in a separate container, which is also placed in the 220° F oven.

The winding machine is set at 60 rpm with the traverse drive for the funnel disconnected. The funnel is moved to one end out of the way. 11.6 grams of triol curative and auxiliary catalyst are placed in the 220° F oven. When the liner batch of resin and plasticizer as well as the curative reach a temperature of 220° F, they are mixed slowly for one minute and degassed for 2 minutes. During degassing, the preheated mandrel is inserted in the winding machine and the doctor blade is brought into working position. Following degassing of the resin-plasticizer-curative mixture, the mandrel is rotated while the mixture is poured tangent to the mandrel where the doctor blade is closest. The pouring is done from one end of the mandrel to the other at a rate which will produce a uniform full coating of the mixture without an excess of resin rolling up behind the doctor blade. After a uniform coating has been applied, the doctor blade is slowly drawn away from the mandrel and cleaned during gellation of the mixture of the mandrel. The mandrel is placed in the rotating oven.

While the liner layer is curing on the mandrel in the rotating oven, 34.8 grams of triol curative is weighed out. While this mixture is preheated in the oven at 220° F, the winding machine is prepared for winding. After the funnel traverse drive is connected, the roving is threaded through the funnel. With the mandrel speed set at 88 rpm, the traverse speed is adjusted to 609 inches per minute. These settings will produce a 63° helix angle. The funnel is positioned at the far left of the mandrel, from which position winding will commence, and the counters are zeroed.

When the urethane resin and plasticixer mixture as well as the curative for the binder reach 220° F, they are mixed and degassed for about two minutes while the mandrel is removed from the rotating oven and placed in the winding machine. A portion of the binder is applied to wet down the mandrel surface and a portion of it is used to fill the funnel. Unused resin is stored in the 220° F oven and withdrawn as needed. Rotation of the mandrel and winding of filament material is commenced, simultaneously winding five strands of roving which pass through the comb-like arrangement beneath the funnel to distribute adjacent strands laterally ⅛ inch apart from one another. Resin is added to the funnel from time to time to keep a supply of resin available. It is considered good practice to wind at a peripheral speed of about 200 feet per minute or less to obtain good penetration of the fiber by the resin. Winding ceases when a wall thickness of about 0.1 inches has been generated, e.g. when the carriage has made 56 round trips along the length of the mandrel. The mandrel is then removed from the winding machine, placed in the oven and cured overnight.

The composite formed on the mandrel has a length equivalent to several couplings. The ends of the composite are cut off to provide a composite in which the helix angle of the fiber is uniform throughout its length, using the above-described cutting disc. The remaining composite is then blown free of any bond with the mandrel and is cut on the mandrel into six inch length containing 50% by weight of urethane resin and 50% by weight of glass fiber.

The resultant couplings have an inside diameter of 4.33 inches, weight 0.097 lb./in., have a collapse force in excess of 300 lb. The couplings, when strained, appear substantially free of slippage at the interface between the binder and fiber, are able to return to their original shape after strain, exhibit low creep and are resistant to stress relaxation. The inner layer is sufficiently flexible to accomodate to surface imperfections in the pipe, and yet has sufficient shear strength to handle the pull-out and axial stress to which the coupling is subjected to use. The glass fiber provides substantially all of the tensile strength of the coupling. There is a balance between the helix angle and the elastomeric properties of the binder which gives a low enough installation force and adequate diametral adaptability without unacceptable loss of pull-out resistance and shear deflection resistance. The couplings provide pull-out resistance which increases to response to and substantially in proportion to pull-out force normally encountered in service.

Using Shell Epon 815 epoxy adhesive, a coupling is cemented to one end of a plain-end four inch nominal diameter plastic pipe section having an outside diameter of 4.350 inches, ± 0.005 inches. One third of the length of the six inch coupling is bonded throughout its length to two inches of the length of the pipe. Two thirds of the length of the coupling extend free of the end of the pipe.

The following coupling and joint properties and capabilities are determined on the basis of pipe/coupling combinations which have been assembled without lubricant, without additional sealants or adhesive (other than that referred to in the preceding paragraph) and without special treatment of the free ends of the pipe sections. Temperature of the pipe and atmosphere is in the range of about 60° to about 75° F, (about 16° to about 24° C).

Pipe coupling combinations of this type, meet the requirements set forth in Table II below:

TABLE II

| Test or Characteristic | Conditioning | Combination | Requirement |
|---|---|---|---|
| 1. Assembly force | $T_1 T_2$ | TC-1 | 13 lbs. × D max. |
| 2. Assembly angular tolerance | $T_1 T_2$ | TC-1 | will assemble with 3° misalignment |
| 3. Pull out - dry | $T_1 T_2$ | TC-2 | 100 lbs. × D min. |
| 4. Shear load deflection | $T_3$ | TC-2 | Maximum of 6 × $10^{-2}$ in./lb. |
| 5. Shear strength | $T_o$ | TC-2 | 100 D min. |
| 6. Infiltration | $T_o$ | TC-2 | Watertight against 5 ft. hydraulic head |
| 7. Infiltration | $T_o$ | TC-2 | Will pass No. 6 under a 50 lbs. × D shear load |
| 8. Infiltration with angular misalignment | $T_o$ | TC-2 | Will pass No. 6 with a 3° angular misalignment |
| 9. Wall thickness | $T_o$ | — | .06 in. × D-maximum |
| 9a. Field bending strength requirement | $T_2$ | TC-2 | No slip to 6000 lb-in. moment for 4 in. dia. conduit |
| 9b. Field bending deflection | — | — | No greater than a solvent weld joint after 15 minutes. |
| 10. Ultimate strength | $T_n$ | TC-1 | 200 lbs. × D |

Note:
"D" is equal to the number of inches of conduit diameter (nominal).
Test conditions.
$T_o$) Ambient (70–75° F)
$T_1$) Hot (105–115° F)
$T_2$) Cold (32° F)
Tolerance combination
TC 1 pipe .005" oversize, coupling .005" undersize (+ 0.7%)
TC 2 pipe .005" undersize, coupling .005" oversize (+ 0.2%)

When coupled pipe sections are subjected to bending moments, the pipe sections themselves become curved. In general, the arc formed by the bent pipe sections includes a discontinuity in the locus of the coupling. The amount of discontinuity is related to the size of the angle Φ between the axes of adjacent pipe sections. The invention has the advantage, as compared to cemented couplings and certain other thin wall cementless couplings, that it tends to minimize Φ, thereby reducing the discontinuity. See FIG. 3. Moreover, the couplings of the present invention have thin walls. For these reasons, groups of conduits with these joints can be buried in both curved and straight configurations in a more compact formation with less tendency for the conduit wall to become deformed by an adjacent coupling.

What is claimed is:
1. A push-type coupling:
   a. said coupling, when viewed in transverse cross-section, defining a closed, convexly rounded figure with a length to D ratio in the range of about ½ to about 2 and a wall thickness in the range of about 0.006 D to about 0.09 D, wherein D is the diameter in inches of the pipe for which the coupling is intended;
   b. said coupling having
      1. an inner surface having a coefficient of friction, relative to the material of said pipe, of at least about 0.7,
      2. a column expansibility of at least about $1 \times 10^{-4}$ inches per pound, and
      3. a pull-out resistance of at least about 100 D pounds;
   c. said coupling including a fiber-reinforced elastomer composite containing sufficient quantities of fiber and elastomer for providing the above-indicated column expansibility and pull-out resistance,
      1. said fiber having a modulus of at least about $6 \times 10^6$ psi, oriented and bonded in said elastomer in an opposed, balanced helical pattern or patterns at a helix angle $\theta$ in the range of about 45° to about 75°, measured from a reference line parallel to the coupling axis, which angle is substantially uniform throughout the length of the coupling in any given layer of said fiber, and
      2. said elastomer being a binder of substantially lower modulus than said fiber having a modulus of at least about 25 psi at 100% elongation and at least about 50 psi at 300% elongation, a tensile strength of at least about 300 psi, and a Shore A durometer hardness in the range of about 15 to about 90, for mechanically interconnecting the opposed fiber pattern or patterns at the above-indicated helix angle, whereby said coupling will enlarge to receive the end of a rigid pipe which is pushed into it and generate pull-out resistance which is in response to and in proportion to pull-out force and which is substantially in excess of that which would be provided by the mere hoop-stress elasticity of the elastomeric material.

2. A coupling in accordance with claim 1 wherein the Shore A durometer hardness of the binder is in the range of about 15 to about 70.

3. A coupling in accordance with claim 1 wherein the Shore A durometer hardness of the binder is in the range of about 30 to about 50.

4. A coupling in accordance with claim 1 wherein the tensile strength of the binder is at least about 600 psi.

5. A coupling in accordanc with claim 1 wherein the tensile strength of the binder is in the range of about 1000 psi to about 5000 psi.

6. A coupling in accordance with claim 1 wherein the modulus of the binder is at least 50 psi at 100% elongation and at least 100 psi at 300% elongation.

7. A coupling in accordance with claim 1 wherein the modulus of the binder is in the range of about 50 psi to about 500 psi at 100% elongation and in the range of about 150 psi to about 1200 psi at 300% elongation.

8. A coupling in accordance with claim 1 wherein the elastomer is a plasticized reaction product of a polyesterurethane prepolymer and a triol curing compound.

9. A coupling in accordance with claim 1 wherein the coupling includes a liner layer to which the fibers are bonded by the elastomeric binder.

10. A coupling in accordance with claim 9 wherein the split-tear resistance of the liner is at least about 5 pounds per lineal inch.

11. A coupling in accordance with claim 9 wherein the split-tear resistance of the liner is at least about 10 pounds per lineal inch.

12. A coupling in accordance with claim 9 wherein said liner layer is formed of an elastomeric material of substantially lower modulus than said fibers, having a modulus at 100% elongation of at least about 25 psi, a tensile strength of at least about 300 psi and a Shore A durometer hardness in the range of about 15 to about 90.

13. A coupling in accordance with claim 9 wherein the liner layer has an internal surface with a coefficient of friction, relative to the coupling and of the pipe with which it is intended to be used, of at least about 0.7.

14. A coupling in accordance with claim 9 wherein the liner layer and binder are each formed from the same polymeric material.

15. A coupling in accordance with claim 9 wherein the liner layer is a plasticized reaction product of a polyester-urethane prepolymer and a triol curing compound.

16. A coupling in accordance with claim 1 wherein the fiber is in the form of roving.

17. A coupling in accordance with claim 1 wherein the fiber is glass fiber.

18. A coupling in accordance with claim 1 wherein the helix angle of the fiber is in the range of about 55° to about 75°.

19. A coupling in accordance with claim 1 wherein the helical pattern includes two or more separately wound layers of fiber.

20. A coupling in accordance with claim 19 wherein the helical pattern includes a first layer of fiber and a second layer of fiber, the second layer being wound at a helix angle which is less than the helix angle in the first layer by about 3° to about 10°.

21. A coupling in accordance with claim 19 wherein the helical pattern includes a first layer of fiber, a second layer of fiber, and a layer of synthetic elastomeric foam material having a density in the range of about 20 to about 60 pounds per cubic foot.

22. A coupling in accordance with claim 1 having an overall thickness of about ¼ inch or less.

23. A coupling in accordance with claim 1 wherein the coupling has a length to diameter ratio in the range of about 1 to 2.

24. A coupling in accordance with claim 1 wherein the column expansibility is in the range of about $2 \times 10^{-4}$ to about $20 \times 10^{-4}$ inches per pound.

25. A coupling in accordance with claim 1 having a shear resistance which provides about 0.12 inches of pipe deflection or less per inch of D under a shear load of 100 D pounds.

26. A coupling in accordance with claim 1 wherein the ring flexibility of the coupling, force per unit of deflection, per unit of length, when compressed diametrically, is less than about 50 psi.

27. A coupling in accordance with claim 1 wherein the column stiffness of the coupling is sufficient to substantially prevent buckling of the coupling wall upon axial insertion of an unlubricated pipe end having a circumference up to 2% greater than the inside circumference of the coupling.

28. A push-type coupling:
  a. said coupling, when viewed in transverse cross-section, defining a closed, convexly rounded figure with length to D ratio in the range of about 1 to about 2 and a wall thickness in the range of about 0.015 D to about 0.035 D, wherein D is the diameter in inches of the pipe for which the coupling is intended;
  b. said coupling having
    1. an inner surface having a coefficient of friction, relative to the material of said pipe, of at least about 0.7,
    2. A column expansibility in the range of about $2 \times 10^{-4}$ to about $20 \times 10^{-4}$ inches per pound,
    3. a pull-out resistance of at least about 100 D pounds, and
    4. a bending resistance of at least about 6,000 inch pounds;
  c. said coupling including a fiber-reinforced elastomer composite containing sufficient quantities of fiber and elastomer for providing the above-indicated column expansibility and pull-out resistance,
    1. said composite including a liner layer of elastomeric material of substantially lower modulus than said fiber,
    said fiber having a modulus of at least about $6 \times 10^6$ psi, oriented around and bonded to said liner layer in an opposed, balanced helical pattern at a helix angle $\theta$ in the range of about 55° to about 75°, measured from a reference line parallel to the coupling axis, which angle is substantially uniform throughout the length of the coupling in any given layer of said fiber, and
    3. said elastomer being a binder of substantially lower modulus than said fiber having a modulus of at least about 50 psi at 100% elongation and at least about 100 psi at 300% elongation. a tensile strength of at least about 600 psi, and a Shore A durometer hardness in the range of about 15 to about 70, for mechanically interconnecting the opposed fiber pattern or patterns at the above-indicated helix angle, said binder being present in a weight percentage in the range of about 40 to about 60 percent, based on the total weight of fiber and binder,
whereby said coupling will enlarge to receive the end of a rigid pipe which is pushed into it and generator pull-out resistance which is in response to and in proportion to pull-out force and which is substantially in excess of that which would be provided by the mere hoop-stress elasticity of the elastomeric material.

29. A pipe having a push-type coupling, comprising
I. a flexible sleeve coupling,
   a. said coupling, when viewed in transverse cross-section, defining a closed, convexly rounded figure with a length to D ratio in the range of about ½ to about 2 and a wall thickness in the range of about 0.006 D to about 0.09 D, wherein D is the diameter in inches of the pipe for which the coupling is intended;
   b. said coupling having
      1. an inner surface having a coefficient of friction, relative to the material of said pipe, of at least about 0.7,
      2. a column expansibility of at least $1 \times 10^{-4}$ inches per pound, and
      3. a pull-out resistance of at least about 100 D pounds;
   c. said coupling including a fiber-reinforced elastomer composite containing sufficient quantities of fiber and elastomer for providing the above-indicated column expansibility and pull-out resistance,
      1. said fiber having a modulus of at least about $6 \times 10^6$ psi, oriented and bonded in said elastomer in an opposed, balanced helical pattern or patterns at a helix angle $\theta$ in the range of about 45 to about 75° measured from a reference line parallel to the coupling axis, which angle is substantially uniform throughout the length of the coupling in any given layer of said fiber, and
      2. said elastomer being a binder of substantially lower modulus than said fiber having a modulus of at least about 25 psi at 100% elongation and at least about 50 psi at 300% elongation, a tensile strength of at least about 300 psi, and a Shore A durometer hardness in the range of about 15 to about 90, for mechanically interconnecting the opposed fiber patterns or patterns at the above-indicated helix angle,
II. a pipe section to which said flexible sleeve is connected in partially overlapping telescoping relationship whereby a free portion of said coupling extends free of said pipe section:
   A. said pipe section, when viewed in transverse cross-section, defining a closed, convexly rounded figure,
   B. said pipe section having sufficient circumferential rigidity so that its circumference will not change more than about 1% on application of 100 pounds per square inch radial pressure thereto, and
   C. said pipe section also having a circumference greater than the inside circumference of the coupling in the range of up to about 2%, to provide an interference fit with said coupling,
whereby said coupling will enlarge to receive the end of a rigid pipe which is pushed into it and generate pull-out resistance which is in response to and in proportion to pull-out force and which is substantially in excess of that which would be provided by the mere hoop-stress elasticity of the elastomeric material.

30. A pipe in accordance with claim 29 in which about 1/6 to about ½ of the length of the coupling overlaps and is adhesively bonded to the end of the pipe section, with the remainder of the length of the coupling extending free of said end.

31. A pipe in accordance with claim 29 wherein the pipe section is composed of polyvinyl chloride or acrylonitrile-butadiene-styrene.

32. A pipe in accordance with claim 29 including an elastomer liner layer upon which the helical pattern is wound.

33. A pipe in accordance with claim 29 wherein the binder comprises a reaction product of polyester-urethane prepolymer and triol curing compound.

34. A pipe in accordance with claim 29 wherein the fiber comprises glass fiber and wherein the binder comprises the reaction product of polyester-urethane prepolymer and triol curing compound.

35. A pipe in accordance with claim 29 wherein the column stiffness of the coupling is sufficient to substantially prevent buckling of the coupling wall upon axial insertion of another such pipe section without lubricant.

36. A conduit in accordance with claim 29 wherein the coupling has a length to diameter ratio in the range of about 1 to about 2.

37. A pipe having a push-type coupling, comprising
I. a flexible sleeve coupling
   a. said coupling, when viewed in transverse cross-section, defining a closed, convexly rounded figure with a length to D ratio a wall thickness in the range of about 0.015 D to about 0.035 D, wherein D is the diameter in inches of the pipe for which the coupling is intended;
   b. said coupling having
      1. an inner surface having a coefficient of friction, relative to the material of said pipe, of at least about 0.7,
      2. a column expansibility in the range of about $2 \times 10^{-4}$ to about $20 \times 10^{-4}$ inches per pound,
      3. a pull-out resistance of at least about 100 D pounds, and
      4. a bending resistance of at least about 6,000 inch pounds;
   c. said coupling including a fiber-reinforced elastomer composite containing sufficient quantities of fiber and elastomer for providing the above-indicated column expansibility and pull-out resistance,
      1. said composite including a liner layer of elastomeric material of substantially lower modulus than said fiber,
      2. said fiber having a modulus of at least about $6 \times 10^6$ psi, oriented around and bonded to said liner layer in an opposed, balanced helical pattern at a helix angle $\theta$ in the range of about 55° to about 75°, measured from a reference line parallel to the coupling axis, which angle is substantially uniform throughout the length of the coupling in any given layer of said fiber, and
      3. said elastomer being a binder of substantially lower modulus than said fiber having a modulus of at least about 50 psi at 100% elongation and at least about 100 psi at 300% elongation, a tensile strength of at least about 600 psi, and a Shore A durometer hardness in the range of about 15 to about 70 for mechanically interconnecting the opposed fiber pattern or patterns at the above-indicated helix angle, said binder being present in a weight percentage in the range of about 40 to about 60 percent, based on the total weight of fiber and binder, II. a pipe section to which said flexible sleeve is connected in partially overlapping telescoping relationship whereby a free portion of said coupling extends free of said pipe section:
  A. said pipe section, when viewed in transverse cross-section, defining a closed, convexly rounded figure,
  B. said pipe section having sufficient circumferential rigidity so that its circumference will not change more than about 1% on application of 100 pounds per square inch radial pressure thereto, and
  C. said pipe section also having a circumference greater than the inside circumference of the coupling in the range of up to about 2%, to provide an interference fit with said coupling whereby said coupling will enlarge to receive the end of a rigid pipe which is pushed into it and generate pull-out resistance which is in response to and in proportion to pull-out force and which is substantially in excess of that which would be provided by the mere hoop-stress elasticity of the elastomeric material.

38. A coupling in accordance with claim 1 having a bending resistance of at least about 2500 inch pounds.

39. A coupling in accordance with claim 1 having a bending resistance of at least about 6,000 inch pounds.

40. A coupling in accordance with claim 1 having an assembly force, with an axial misalignment not exceeding 3°, of less than about 50 pounds.

41. A coupling in accordance with claim 1 having a ratio of pull-out resistance to assembly force, with an axial misalignment not exceeding 3°, of at least about 3 to 1.

42. A coupling in accordance with claim 1 having a ratio of pull-out resistance to assembly force, with an axial misalignment not exceeding 3°, of at least about 8 to 1.

* * * * *